United States Patent

Ikeda

(12) United States Patent
(10) Patent No.: US 6,697,720 B2
(45) Date of Patent: Feb. 24, 2004

(54) VEHICLE ACTIVE DRIVE ASSIST DEVICE AND VEHICLE PROVIDED WITH THE SAME

(75) Inventor: Atsushi Ikeda, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/153,733

(22) Filed: May 24, 2002

(65) Prior Publication Data

US 2002/0183906 A1 Dec. 5, 2002

(30) Foreign Application Priority Data

May 29, 2001 (JP) ........................ 2001-161124

(51) Int. Cl.$^7$ .............. G08G 1/16; G06F 7/00
(52) U.S. Cl. ............ 701/36; 701/28; 701/301; 348/119
(58) Field of Search .............. 701/28, 36, 207, 701/211, 301; 348/118, 119; 342/70; 340/435, 436

(56) References Cited

U.S. PATENT DOCUMENTS 5,530,420 A * 6/1996 Tsuchiya et al. ............ 340/435
6,411,867 B1 * 6/2002 Sakiyama et al. ............ 701/1
6,564,130 B2 * 5/2003 Shimazaki et al. ........... 701/41

FOREIGN PATENT DOCUMENTS

| JP | 06-234341 |   | 8/1994 |
| JP | 09-128687 | * | 5/1997 |

* cited by examiner

*Primary Examiner*—Michael J. Zanelli
(74) *Attorney, Agent, or Firm*—McGinn & Gibb, PLLC

(57) ABSTRACT

A vehicle active drive assist device includes an environmental position information forming device for forming position information of the environment in the periphery of a vehicle including the travelling direction of the vehicle, a guide for guiding the vehicle in passing through a narrow road in the travelling direction based on the position information of the environment in the periphery of the vehicle, a guide narrow-road re-passing detector for detecting that the vehicle is returned to the narrow road which the vehicle has been guided on and passed through, and the guide being applicable to guide the vehicle so as to reach the narrow road by either or both of the movement including turning of the vehicle and the backing of the vehicle, based on the position information of the environment in the periphery of the vehicle formed by the environmental position information forming device, when the vehicle is returned to the narrow road again which the vehicle has been guided on and so as to pass through the narrow road.

14 Claims, 13 Drawing Sheets

VEHICLE ACTIVE DRIVE ASSIST DEVICE AND VEHICLE PROVIDED WITH THE SAME

BACKGROUND OF THE INVENTION

1. Field of the Invention

The present invention relates to a vehicle active drive assist device for assisting a driver in driving a vehicle, which provides accurate information on the probability of minor collision of the vehicle with barriers such as guardrails, side walls, parked vehicles, and so forth, so that the vehicle can easily enter and pass through a narrow road or the like, and to a vehicle provided with the same.

2. Description of the Related Art

In recent years, overall active drive assist systems (ADA system) which positively assist drivers in driving-operation have been developed to enhance the safety of vehicles. A part of the systems have been practically used. According to the ADA system, different probabilities of collision of the object vehicle with a vehicle running ahead, scraping with a barrier, departing of the vehicle from a traffic lane, and so forth are estimated based on the running environmental information of the vehicle and the running state thereof, and when it is anticipated that the safety can not be assured, the driver is informed, and other control or the like is carried out.

As devices for obtaining the running environmental information of vehicles, laser radars have been publicly known. On the other hand, in recent years, it has become possible that images of landscapes and solids placed forward of a vehicle, captured by plural cameras mounted on the vehicle are processed, and thereby, the road and the traffic environments are three-dimensionally recognized at high precision and in time sufficiently for practical use.

Vehicle parking assist devices which use one of the functions of the ADA system, that is, decision whether a vehicle can enter a narrow road, and a narrow road guiding function by which the vehicle is guided in running on a narrow road so as to be prevented from scraping a barrier have been developed. For example, according to a technique described in Japanese Unexamined Patent Application Publication No. 6-234341, a parking-space is determined, and acoustic instruction is made so that a vehicle is guided to the parking position in a guiding-route determined by operation based on the positional relation between the parking and present positions.

According to the above-described narrow road guiding device of the related art, it is possible to guide a vehicle so that the vehicle can pass through a narrow road existing forward of the vehicle. However, a hid body can not be recognized as well as by man's eyes. Therefore, in some cases, another narrow road through which the vehicle can not be driven may be found after the vehicle enters the narrow road. For example, as shown in FIG. 13, a narrow road 1, which can be seen from the starting position, can be naturally recognized. For this reason, if the vehicle passes through the narrow road 1 and arrives at a position immediately before a narrow road 2, and the vehicle can not pass through the narrow road 2, it is needed that the vehicle is turned (the direction is changed) in some place or is backed on the road which the vehicle has passed through and passes through the narrow road 1 again. However, no devices which are useful for guiding drivers in driving vehicles on such complicated drive-routes have been available.

SUMMARY OF THE INVENTION

In view of the foregoing, the present invention has been devised, and it is an object of the present invention to provide a vehicle active drive assist device which has high practical applicability, that is, can appropriately guide a vehicle, needless to say, when the vehicle passes through a narrow road which can be seen with the driver, and also, when the vehicle has passed through a narrow road, and is returned to pass the narrow road, and to provide a vehicle having the vehicle active drive assist device.

Accordingly, there is provided a vehicle active drive assist device comprising an environmental position information forming means for forming position information of the environment in the periphery of a vehicle including the travelling direction of the vehicle, a guide means for guiding the vehicle in passing through a narrow road in the travelling direction based on the position information of the environment in the periphery of the vehicle, a guide narrow-road re-passing detection means for detecting that the vehicle is returned to the narrow road which the vehicle has been guided on and passed through, the guide means being applicable to guide the vehicle so as to reach the narrow road by either or both of the movement including turning of the vehicle and the backing of the vehicle, based on the position information of the environment in the periphery of the vehicle formed by the environmental position information forming means, when the vehicle is returned to the narrow road again which the vehicle has been guided on and so as to pass through the narrow road.

The above and other objects, features and advantages of the invention will become more clearly understood from the following description referring to the accompanying drawings.

BRIEF DESCRIPTION OF THE DRAWINGS

FIG. 13 illustrates a narrow road which lies ahead of a narrow road for which a vehicle is guided, and can not be seen, and which the vehicle can not pass through.

DETAILED DESCRIPTION OF THE PREFERRED EMBODIMENTS

Hereinafter, embodiments of the present invention will be described with reference to FIGS. 1 to 12.

Figure 1:
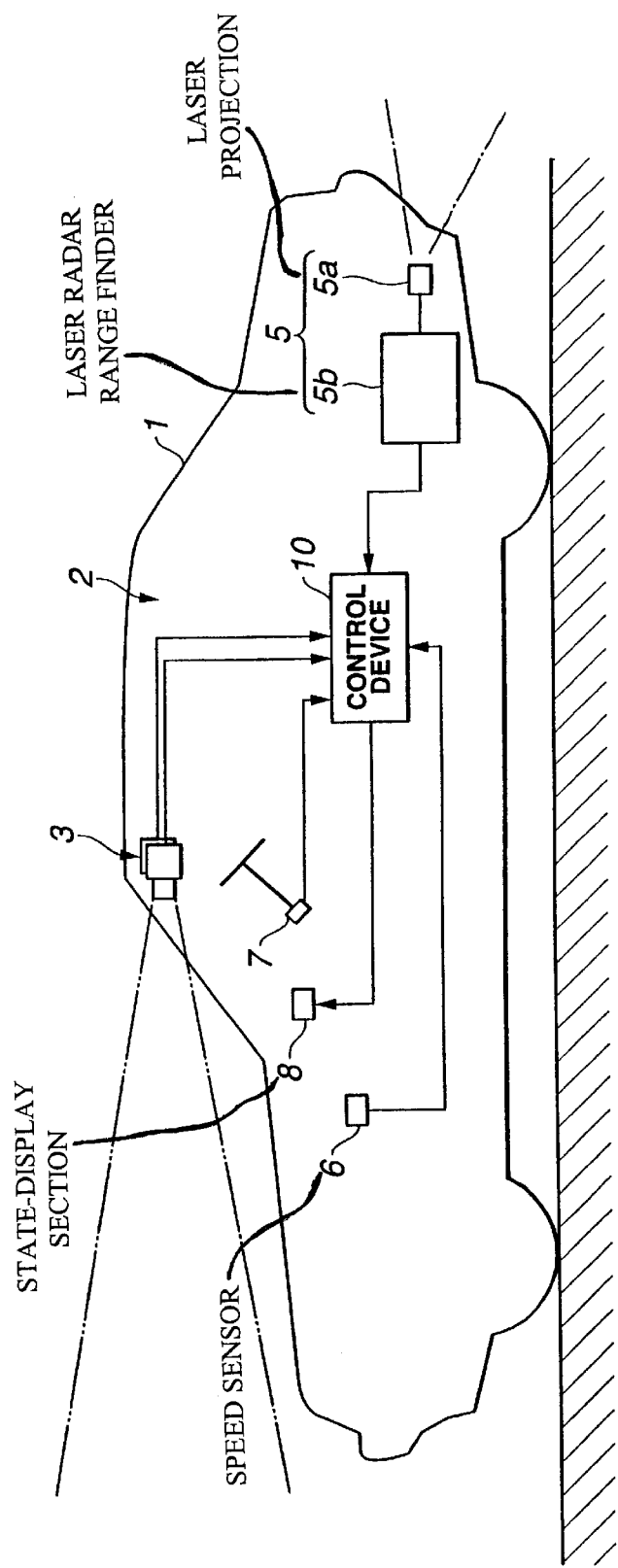
FIG. 1 schematically shows the arrangement of a vehicle active drive assist device.

As shown in FIG. 1, a vehicle active drive assist device 2 for assisting a driver to drive a vehicle is mounted onto a vehicle 1 such as an automobile or the like. Typically, the vehicle active drive assist device 2 has functions of deciding whether the vehicle can enter a narrow road or not and preventing minor collision of the vehicle with a barrier.

This embodiment of the present invention describes only the narrow road guiding function of the vehicle active drive assist device 2 by which it is decided whether a vehicle can enter a narrow road and minor collision of the vehicle with a barrier is prevented. Description of the other functions thereof is omitted.

The vehicle active drive assist device 2 contains as a stereo-optical system one set (right and left) of CCD cameras 3 which use solid state imaging devices such as charge coupled devices (CCD) or the like. The right and left CCD cameras 3 are fixed at an interval between them in the front of the ceiling in a vehicle room so that objects existing outside the vehicle can be stereo-image-picked up from different eye points. Signals of a image picked-up in the travelling direction of the vehicle 1 by one set of the CCD cameras 3 are input to a control device 10.

A laser radar 5 is connected to the vehicle active drive assist device 2, and comprises a laser projection unit 5a which is fixed so as to face backward of the vehicle, projects and receives laser beams, and has a function of scanning in the right and left directions, and a laser radar rangefinder 5b which calculates the distance between the finder and a solid based on the time required for projecting and receiving a laser beam, and also calculates the two-dimensional position of a solid in the laser-beam scanning direction. The two-dimensional solid position information detected by means of the laser radar 5 is input as practically detected solid position information.

Moreover, the vehicle active drive assist device 2 is configured so that each signal from a speed sensor 6 for detecting the speed of the vehicle 1 and a steering wheel angle sensor 7 for detecting a steering wheel angle of the vehicle 1 is input to the control device 10. The control device 10 decides whether the vehicle can enter a narrow road or not, controls, and outputs to a state-display section 8 so as to perform a function of guiding a driver in travelling on the narrow road, preventing minor collision of the vehicle with a barrier based on the above-described information (image signals from the CCD cameras 3, two-dimensional solid-position information from the laser radar 5, and each signal from the speed sensor 6 and the steering wheel angle sensor 7).

Figure 12:
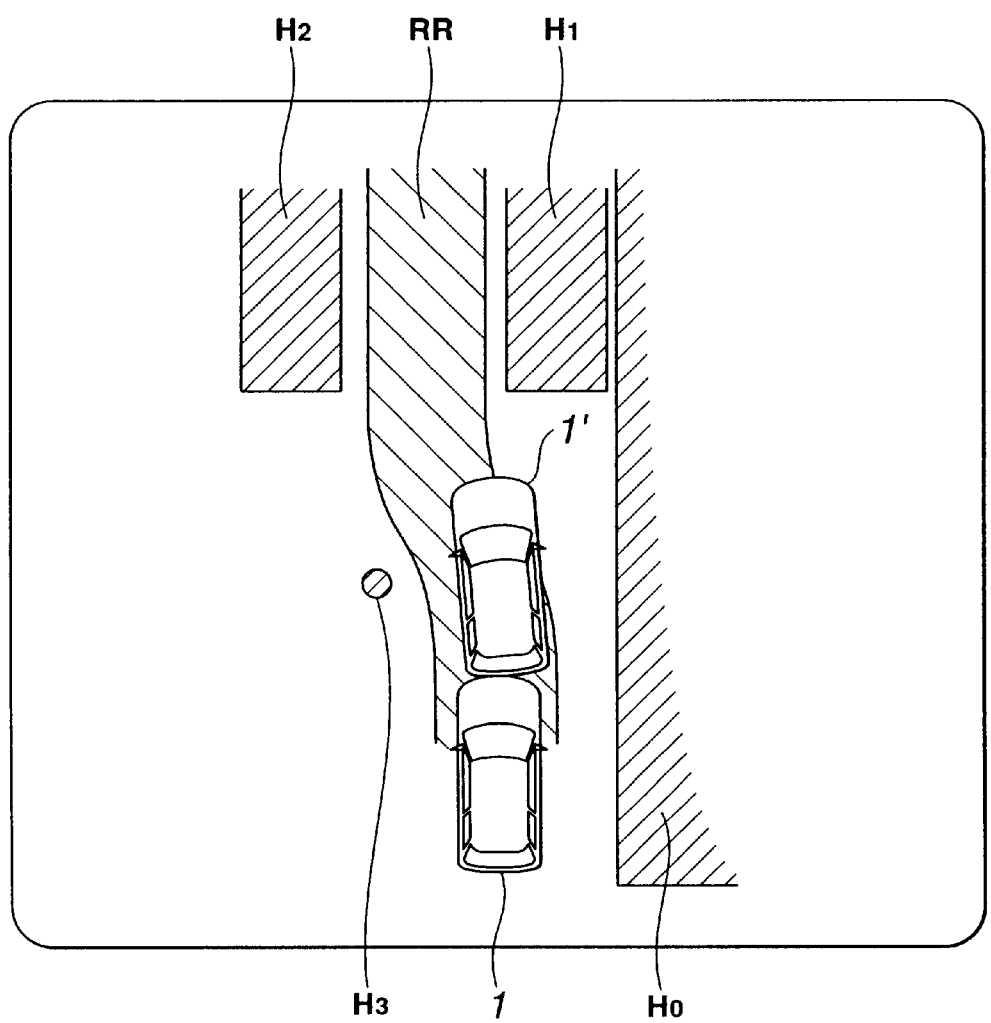
FIG. 12 illustrates an example of display on a monitor.
Figure 13:
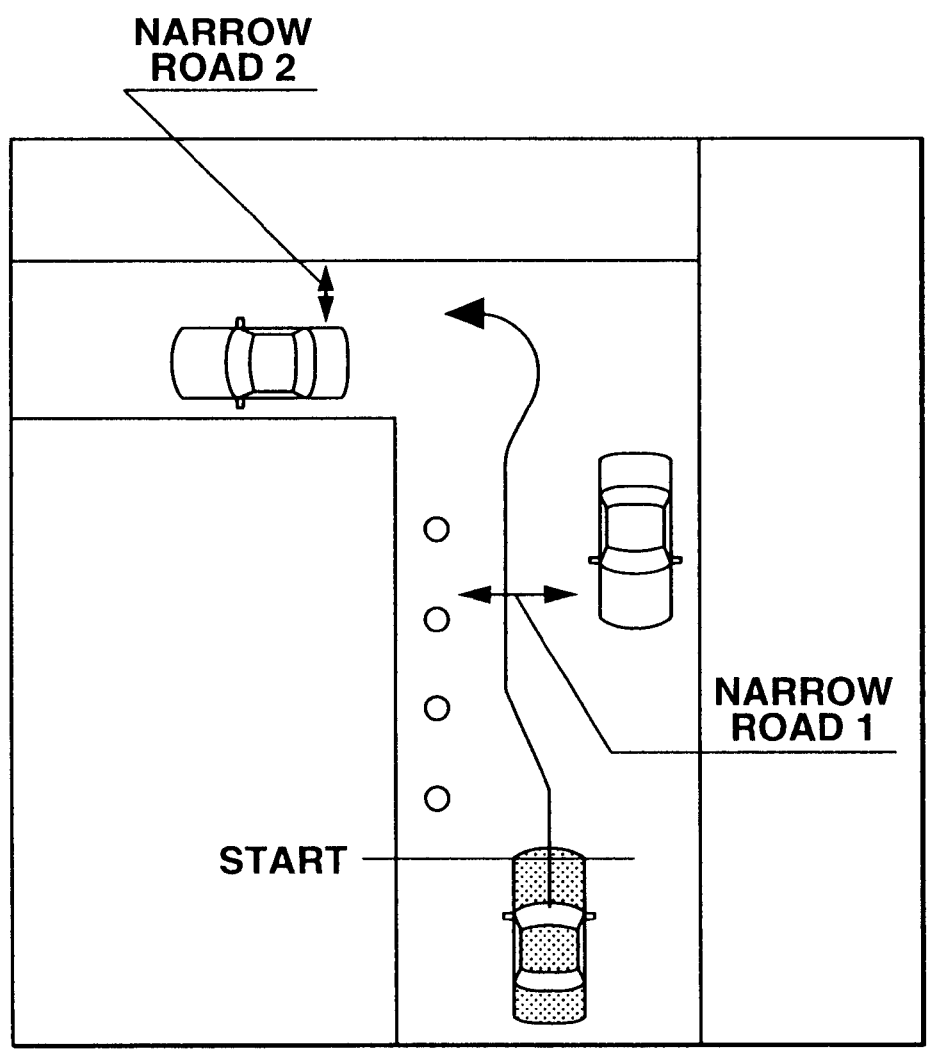

The state-display section 8 visually displays, in the form of a two-dimensional map obtained by viewing from the vertical direction, the positional relation between the vehicle 1 and a barrier (a fence H0, parked vehicles H1 and H2, and a telegraph pole H3), an anticipatory position 1' of the vehicle 1 which the vehicle 1 will reach set-time later if the vehicle 1 continues to travel under this driving condition (a steering wheel angle θ and a vehicle speed V), and an ideal drive-route RR on the narrow road through which the vehicle will be driven, correspondingly to a signal output from the control device 10, as shown in FIG. 12, for example. In the case of FIG. 12, for clearly understanding, the color display is employed, that is, the ideal drive-route RR is blue-colored, the barriers are red-colored, and the anticipatory position after a set time is yellow-colored, for example.

Figure 2:
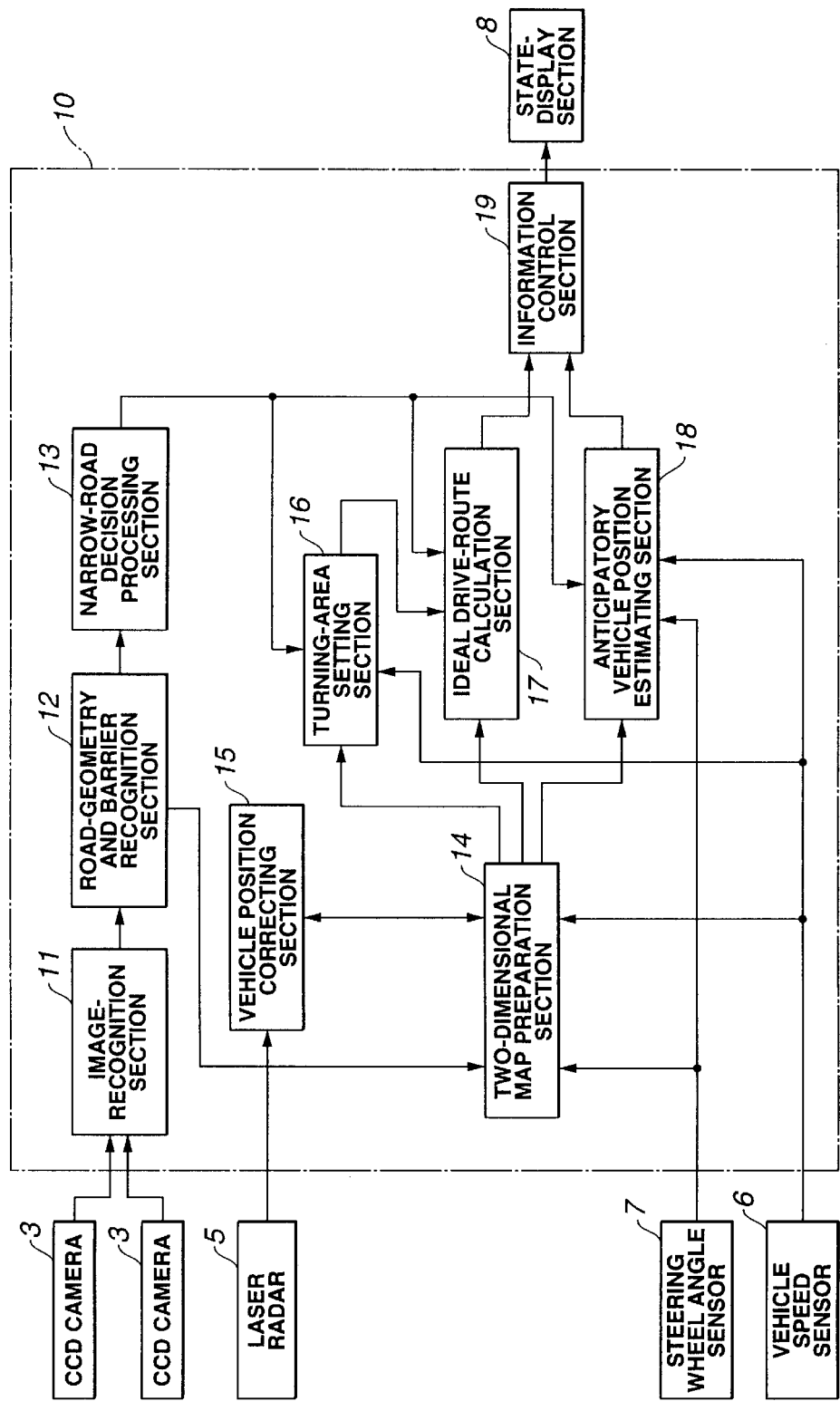
FIG. 2 is a block diagram of the functions of the vehicle active drive assist device.

The control device 10 comprises a microcomputer and its peripheral circuits, that is, as shown in FIG. 2, comprises an image-recognition section 11, a road-geometry and barrier recognition section 12, a narrow-road decision processing section 13, a two-dimensional map preparation section 14, a vehicle position correction section 15, a turning-area setting section 16, an ideal drive-route calculation section 17, an anticipatory vehicle position estimating section 18, and an information control section 19.

In the image-recognition section 11, one pair of stereo-images of the environment in the travelling direction of the vehicle 1 picked up by the CCD cameras are processed based on the shift amounts of corresponding positions according to the principle of triangulation, so that distance-information on the overall image of the environment is obtained, and a distance-image showing the three-dimensional distance-distribution is prepared. The distance-image is output to the road-geometry and barrier recognition section 12.

In the road-geometry and barrier recognition section 12, the distance-distribution with respect to the distance-image output from the image-recognition section 11 is histogram-processed, so that solids or the like such as roads, barriers, and so forth are recognized. The relative position coordinates (relative position information) of the solids seen from the vehicle 1 are calculated, and output to the narrow-road decision processing section 13 and the two-dimensional map preparation section 14.

In the narrow-road decision processing section 13, it is decided whether the vehicle 1 can pass through ranges set substantially in front of the vehicle 1 in the travelling direction or not, and whether a narrow road exists or not, based on the relative position information in the travelling direction of the vehicle 1 which is input via the road-geometry and barrier recognition section 12.

Here, the above-described ranges are defined as a range from the front end of the vehicle 1 to about 20 m in the forward direction of the vehicle 1, surrounded by tangential lines α 1L and α 1R with respect to the outermost edges on the right and left sides of the vehicle 1 (for example, door mirrors), and a range surrounded by the lines α 2L and α 2R which are equal to the tangential lines α 1L and α 1R added to by margins provided on the right and left outsides of the vehicle 1, respectively. The range may be surrounded by lines α 2L' and α 2R' which are equal to the tangential lines α 1L and α 1R added to by margins gradually increasing as the lines elongate more distantly from the vehicle 1.

Intervals between barriers such as a vehicle moving at an extremely low speed or sopping in the travelling direction, guardrails on the side ends of the road, curbs and a fence of a house, and so forth are measured, and the substantial road-width of a road or the like is detected. It is decided whether the vehicle 1 can pass through the road or not based on the relation between the road-width, the maximum width of the vehicle 1, and a margin. For example, it is decided that the vehicle can not pass through the road, if the width of the road through which the vehicle 1 is to pass is smaller than the sum of the maximum width of the body of the vehicle 1 and a margin of 10 cm, or if there is no road through which the vehicle 1 can pass. Moreover, it is decided that there exists a narrow road, if the road-width is smaller than the sum of the maximum width of the vehicle body and a margin of 40 cm, and is not less than the sum of the maximum width of the vehicle body and a margin of 10 cm. In the case in which the other results are obtained, it is decided that there exists a road through which the vehicle 1 can pass having a sufficient margin in the width direction. These results are output to the turning-area setting section 16, the ideal drive-route calculation section 17, and the anticipatory vehicle position estimating section 18.

The two-dimensional map preparation section 14 is provided as a means for preparing environmental position information, and updates the environmental position information (two-dimensional map) prepared previously (the last time) one after one, based on a steering wheel angle θ detected by the steering wheel angle sensor 7, a vehicle speed V detected by the speed sensor 6, and the relative position information sent from the road-geometry and barrier recognition section 12 to prepare a two-dimensional map of the environment in the periphery of the vehicle 1 including that in the travelling direction of the vehicle 1, and outputs the two-dimensional map to the ideal drive-route calculating section 17 and the anticipatory vehicle position estimating section 18.

Especially, when the vehicle 1 is returned along the road on which the vehicle 1 traveled, and the vehicle 1 is returned within a predetermined time (for example, in 10 seconds after stopping), the two-dimensional map preparation section 14 outputs the prepared two-dimensional map to the vehicle position correcting section 15 and the turning-area setting section 16. When the vehicle position, corrected in the vehicle position correcting section 15, is input to the two-dimensional map preparation section 14, the stored two-dimensional map is corrected based on this data. Thus, the two-dimensional map preparation section 14 functions as a guide-narrow road re-passing-through detection means.

Figure 8:
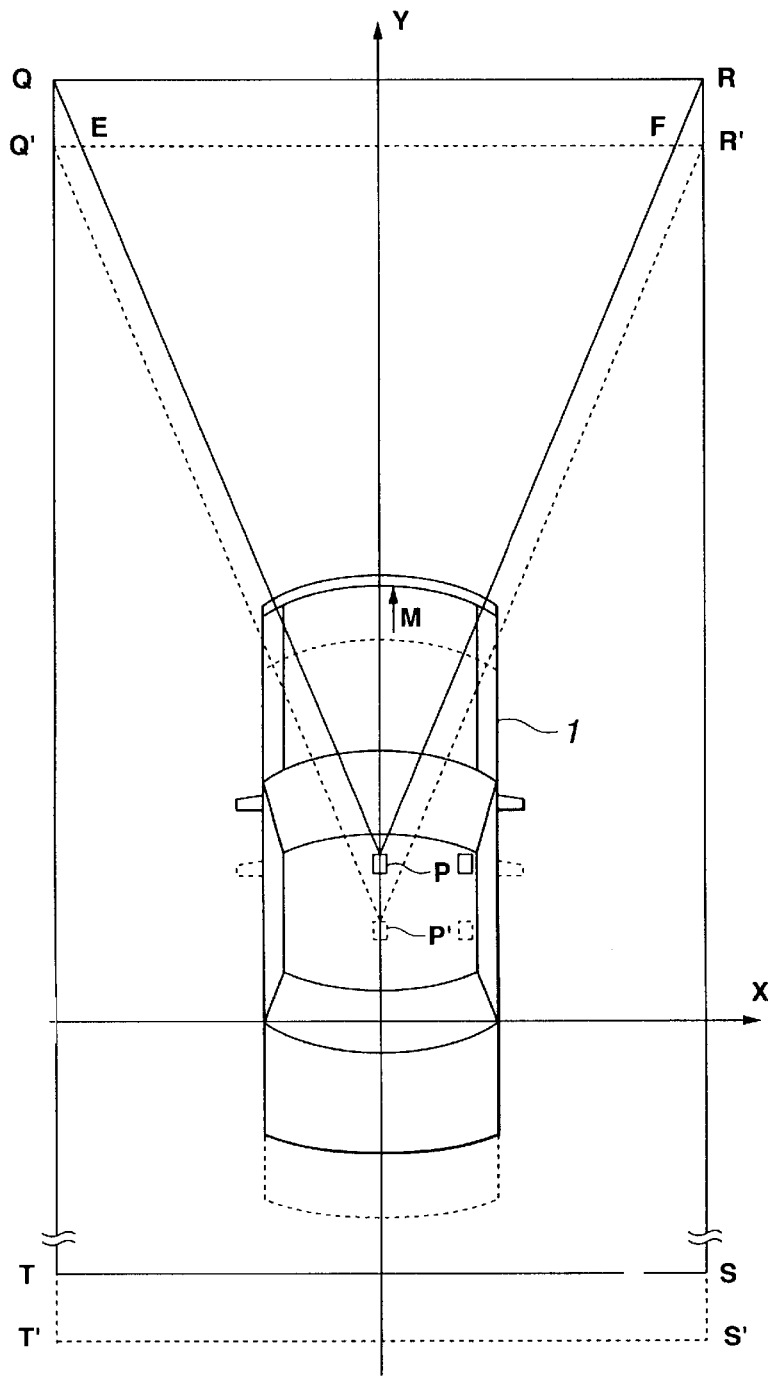
FIG. 8 illustrates solid-position information in the periphery of the vehicle.

As shown in FIG. 8, the environmental position information (two-dimensional map) on the environment of the vehicle 1 is position information of solids existing within an area QRST previously set on an XY plane and having the center set at the position of the vehicle 1. The position information is formed using the relative position information (information within the area PQR) obtained by calculating this time and sent from the road-geometry and barrier recognition section 12, and information obtained till the last time and sent from the road-geometry and barrier recognition section 12.

More particularly, this time, the vehicle 1 moves from the area (two-dimensional map) Q'R'S'T' of the solid position information calculated the last time and stored (movement amount M=(vehicle speed)·(measuring time)). Thus, the two-dimensional map preparation section 14 when it newly receives relative position information of the area PQR from the road-geometry and barrier recognition section 12, updates the environmental position information so that the area Q'R'S'T' of the two-dimensional map prepared the last time is shifted by the shift amount M to obtain information on the this-time vehicle position. Simultaneously, the data (the area TSS'T') which is out of the storage of the area Q'R'S'T' in the two-dimensional map prepared the last time, and the area PEF thereof overlapping the relative position information of the newly obtained area PQR are erased. The relative position information on the area PQR is added to form the area QRST in the this-time two-dimensional map. FIG. 8 shows the vehicle 1 which moves forward for easily understanding. In the case in which the vehicle 1 is turned, the this-time two-dimensional map can be also obtained in the same manner as described above.

Thus, when a driver is guided in driving on a narrow road by the above-described two-dimensional map, he can conventionally recognize solids existing in the travelling direction of the vehicle 1, and moreover, can comprehend the positions of the solids which exist on the side of the vehicle, caused by the movement of the vehicle. Thus, the solids can be recognized in a wide range in the periphery of the vehicle. For this purpose, it is not required to further provide other cameras and means for recognizing solids, in the front of the vehicle 1.

The position information on the solids obtained the last time is shifted based on the detected movement amount of the vehicle 1 according to the following calculation formulae, for example.

Figure 9:
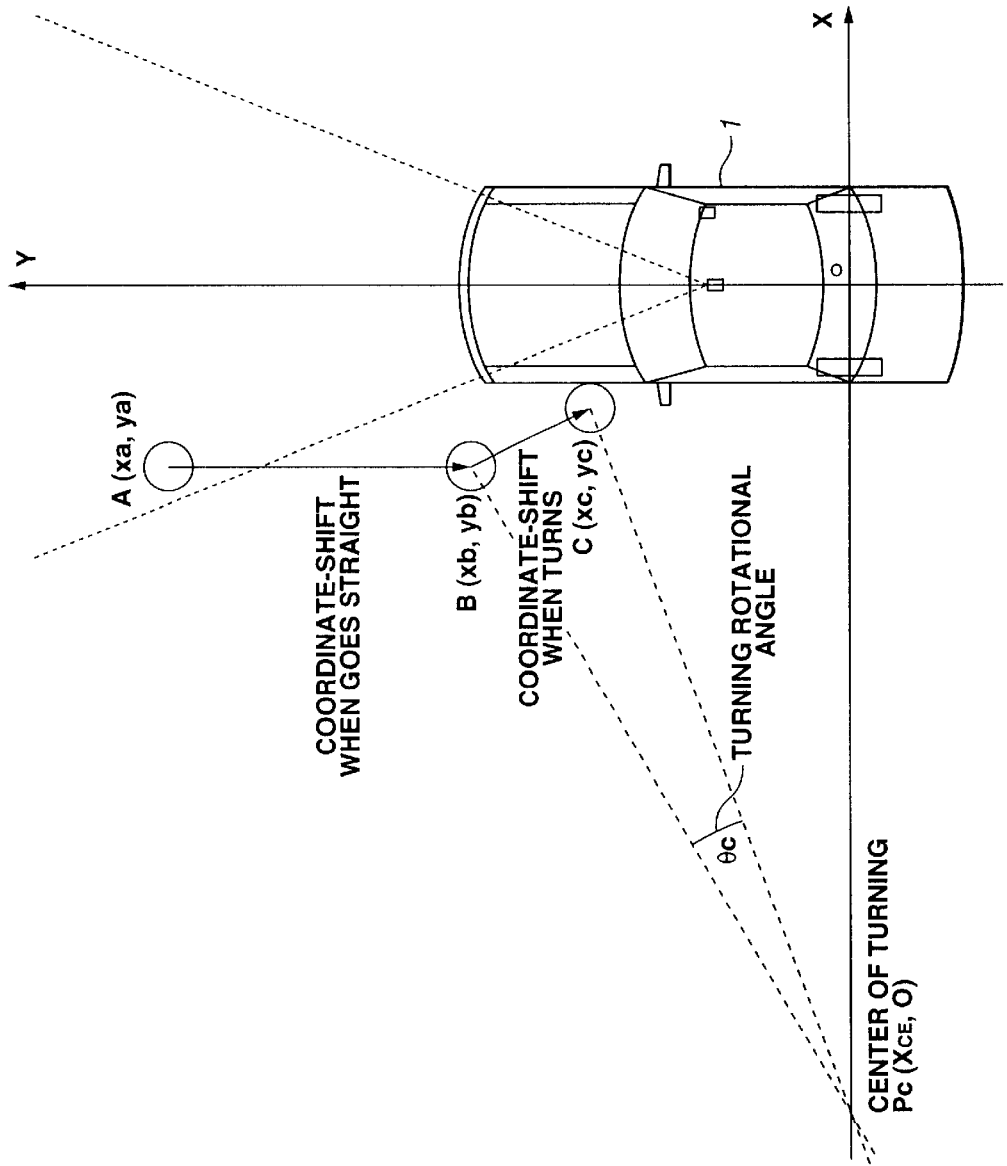
FIG. 9 illustrates shifting of the solid-position information.

Referring to FIG. 9, when the vehicle 1 runs straight, a solid existing at a point A (xa, ya) is relatively shifted to a point B (xb, yb) (xa=xb). When the vehicle runs straight, the real steering angle δ, caused by a steering wheel angle θ, is zero, and yb=ya−ΔM in which ΔM represents the shift amount of the vehicle. That is, when the vehicle 1 runs straight, the two-dimensional map prepared the last time and represented by a coordinate (x old, y old) is shifted to a new two-dimensional map prepared this time and represented by a coordinate (x new, y new) according to the following two formulae (1) and (2).

$$x\ new = x\ old \tag{1}$$

$$y\ new = y\ old - \Delta M \tag{2}$$

It is to be noted that even if the real steering angle δ is not strictly zero, the vehicle is taken as "runs straight", provided that the angle δ is within a previously set range. The previously set range may be variable using a parameter such as a vehicle speed or the like.

When the vehicle 1 is turned (δ≠0), a solid existing at a point B (xb, yb) is relatively shifted to a point C (xc, yc). Referring to the coordinate Pc (X CE, Y CE) of the center of the turning, X CE is determined in reference to a table previously set based on specifications of the vehicle 1 using the real steering angle δ (expressed by f (δ)).

$$XCE = f(\delta) \tag{3}$$

$$YCE = (\text{offset to wheel shaft}) = 0 \tag{4}$$

The rotational angle θ c of turning is calculated according to the following formula (5);

$$\theta c = \Delta M/(XCE - XW) \tag{5}$$

in which X W represents an offset in the X direction from the position of the cameras to the left rear wheel.

When the vehicle 1 is turned, the two-dimensional map prepared the last time and represented by the coordinate (x old, y old) is shifted to a new two-dimensional map prepared this time and represented by a coordinate (x new, y new) using the center coordinate Pc (X CE, Y CE) and the turning angle θ c as follows;

$$r = ((x\ old - XCE)^2 + (y\ old - YCE)^2)^{1/2}$$

$$a = \arctan((y\ old - YCE)/(x\ old - XCE))$$

Accordingly, $$x\ new = r \cdot \cos(a + \theta c) + XCE \tag{6}$$

$$y\ new = r \cdot \sin(a + \theta c) + YCE \tag{7}$$

The vehicle position correcting section 15 is provided as a means for forming environmental position information together with the two-dimensional map preparation section 14. Two-dimensional solid position information is input via the laser radar 5 to the vehicle position correcting section 15, and moreover, a two-dimensional map prepared when the vehicle 1 is about to be returned on the road where the vehicle 1 traveled, output from the two-dimensional map preparation section 14, is input to the vehicle position correcting section 15. As shown in the vehicle position correction routine which will be described later, these two-dimensional maps are compared, so that the vehicle position on the two-dimensional map is corrected, and is output to the two-dimensional map preparation section 14.

Specifically, the position information (X R1, Y R1) and that (X R2, Y R2) of two barriers are detected by the laser radar 5. In the vehicle position correcting section 15, the positions (X M1, Y M1) and (X M2, Y M2) on the two-dimensional map of the barriers which correspond to the position information (X R1, Y R1) and (X R2, Y R2) are extracted. The shift amounts (ΔX=X R2–X M2, ΔY=Y R2–Y M2) by which the position (X M2, Y M2) on the two-dimensional map of the barrier is offset using the practical position (X R2, Y R2) of the second barrier as a reference are calculated. The map is shifted by the shift amounts, so that the position in the X Y direction of the vehicle 1 is corrected.

Moreover, the angle defined by the straight line passing through the practical coordinates (X R1, Y R1) and (X R2, Y R2) of the first and second barriers and the straight line passing through the coordinates (X M1, Y M1) and (X M2, Y M2) on the map of the first and second barriers is calculated as an angular correction amount. The two-dimensional map is rotated on the practical coordinate (X R2, Y R2) of the second barrier as a center, so that the angular direction of the vehicle 1 is corrected.

The two-dimensional map prepared when the vehicle is about to be returned on the road where the vehicle 1 traveled, output from the two-dimensional map preparation section 14, is input to the turning-area setting section 16. It is detected whether there exists an area on the road where the vehicle 1 will be returned (the road on the two-dimensional map where the vehicle 1 traveled), in which the direction of the vehicle 1 can be returned.

Figure 10:
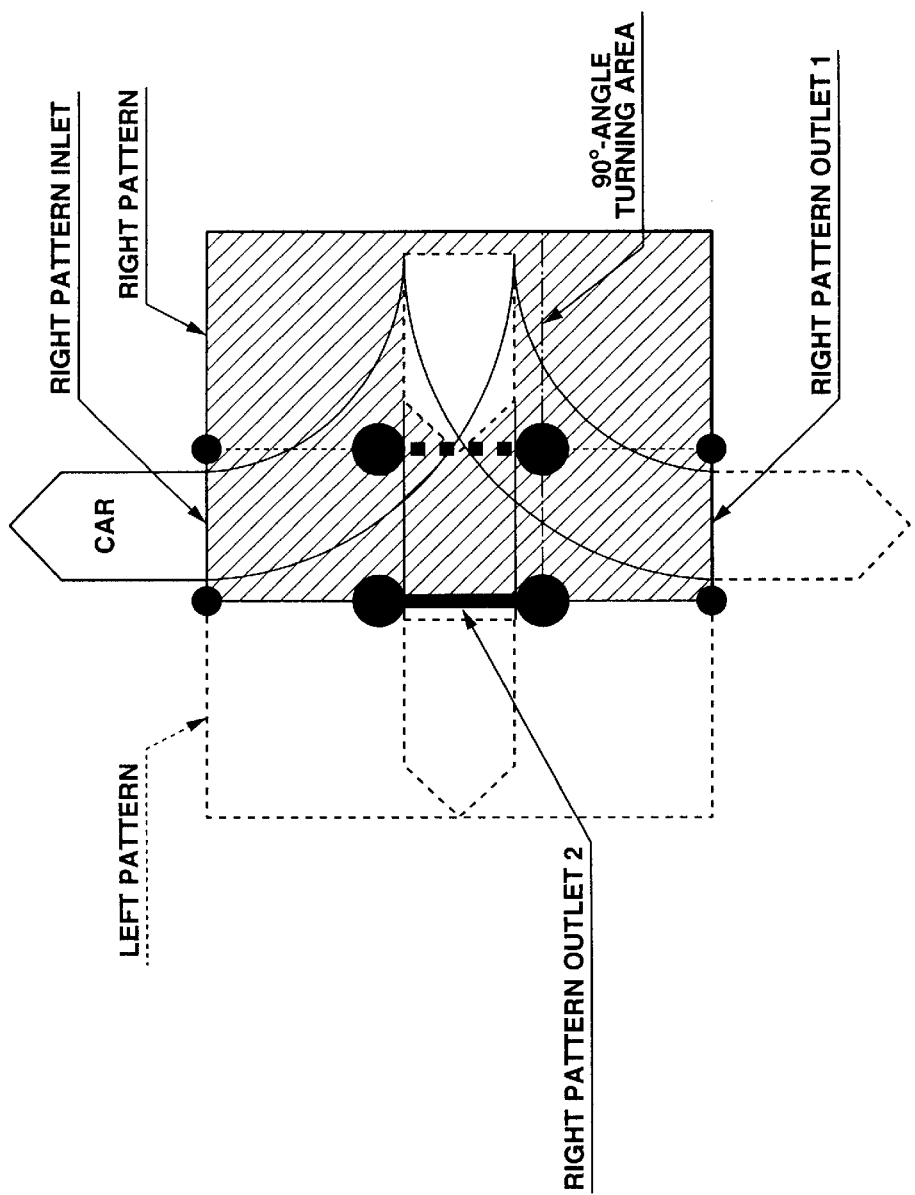
FIG. 10 illustrates a turning-area.

Specifically, as shown in FIG. 10, the turning-area is set for each type of vehicles, e.g., depending on the minimum turning radii or the like of the vehicles. For example, the area has a size of 8 m×10 m. Two patterns, that is, right and left patterns are set, depending on the different inlets through which the vehicle is backed.

According to the example of the right pattern, the vehicle is turned and backed through the inlet provided in the upper-left portion of the turning-area shown in FIG. 10 to the right end thereof. The vehicle, after it reaches the right end, moves forward with being turned and passes through an outlet 1 provided in the lower-left portion of the turning-area shown in FIG. 10. Thus, the direction of the vehicle is returned. According to the left pattern, the vehicle is backed through the inlet provided in the upper-right portion of the turning-area shown in FIG. 10, and is driven in a route symmetrical to that of the above-described right-pattern. This turning-area is applied not only for the case in which the direction of the vehicle is turned by 180° but also for the case in which the direction of the vehicle is turned by 90° as understood in a right-pattern outlet 2. Moreover, such an area for turning at a right angle as described above and shown by a broken line in FIG. 10 may be provided, separately from the above-described turning-area.

The ideal drive-route calculation section 17, when a narrow-road exists in the travelling direction of the vehicle 1, and the vehicle enters the narrow road, carries out a calculation to obtain an ideal drive-route, based on the two-dimensional map given by calculating in the two-dimensional map preparation section 14. Moreover, when a turning-area is set on the two-dimensional map in the turning-area setting section 16, the ideal drive-route calculation section 17 carries out a calculation to obtain an ideal drive route in which the vehicle enters the set turning-area, is turned in the turning-area, and passes through an outlet of the turning-area to enter the narrow road through which the vehicle 1 has traveled. Moreover, when the vehicle 1 is returned on the road which the vehicle 1 has traveled, and no turning-area is set on the two-dimensional map in the turning-area setting section 16, the section 17 carries out a calculation to obtain an ideal drive-route in which the vehicle 1 is backed and enters the narrow road where the vehicle 1 has traveled. Thus, one of the ideal drive-routes obtained by calculating in the ideal drive-route calculation section 17 as described above is output to the information control section 19.

The setting of the ideal drive-route will be specifically described in reference to the case in which the vehicle 1 moves forward and enters the narrow road. When a narrow road SP defined by parked vehicles H1 and H2 as barriers exists forward of the vehicle 1 (the space between the tangential line L1 at the left-side outermost edge of the parked vehicle H1 and the tangential line L2 at the right-side outermost edge of the parked vehicle H2), as shown in FIG. 11A, and the ideal drive-route calculation section 17 carries out a calculation to obtain an ideal drive-route in which the vehicle 1 enter the narrow road SP, a two-dimensional map shown in FIG. 11B output from the two-dimensional map preparation section 14 is input as vehicle-periphery information.

Figure 11C:
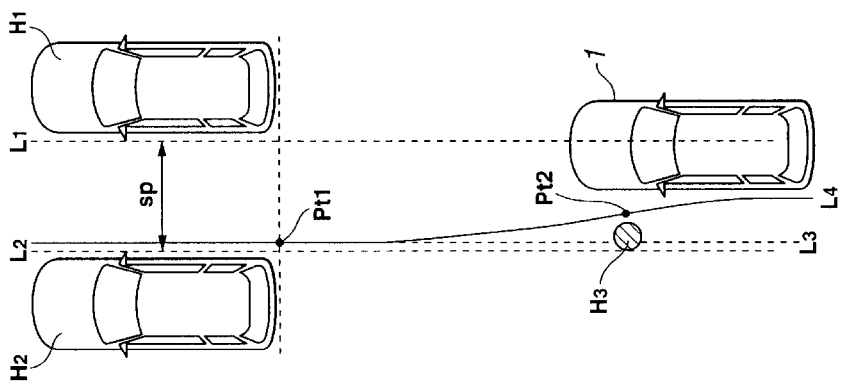
FIG. 11C illustrates an ideal drive-route set based on the two-dimensional map of FIG. 11B.
Figure 11B:
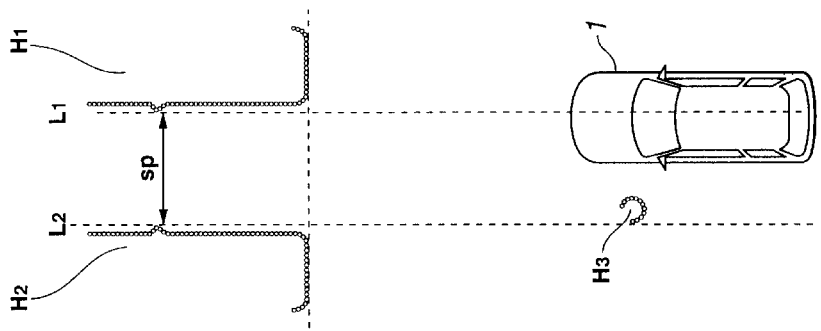
FIG. 11B illustrates a two-dimensional map prepared for the narrow road of FIG. 11A.
Figure 11A:
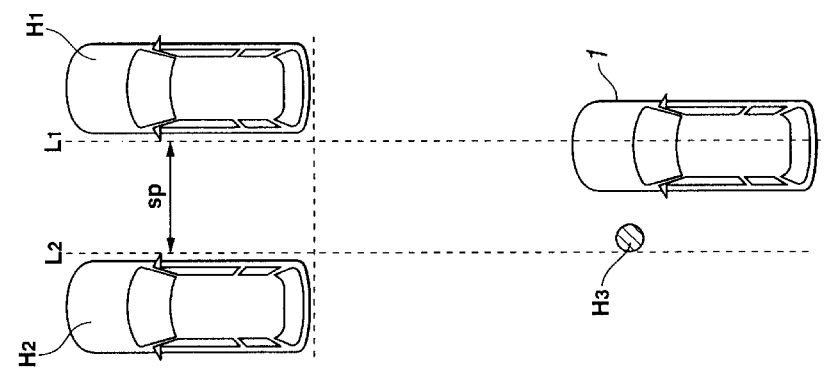
FIG. 11A illustrates an example of a narrow road lying forward of the vehicle.

As shown in FIG. 11C, a straight line L3 is drawn on the two-dimensional map so as to be shifted from the straight line L2 with a predetermined margin toward the narrow road SP side. The intersecting point between the straight line L3 and a straight line passing by the parked vehicles H1 and H2 on the vehicle 1 side is represented by Pt1. A margin having a predetermined width is provided in the periphery of an electric pole H3. The point at which minor collision with the vehicle 1 is most possible is represented by Pt2.

In a coordinate system in which the point Pt2 is plotted as the origin, and the direction in which the vehicle 1 moves on the narrow road SP is set to be positive in the direction of the Y-axis, $x = -k_1 \cdot \tanh(k_2 \cdot y)$ where $k_1$ is about 1 is set so as to be drawn substantially along the straight line L3 as an asymptotic line in the vicinity of the point Pt1. A curved line L4 drawn according to this formula is an ideal route in which the left-side outermost-edge of the vehicle 1 moves. The right-side route is determined based on this left-side route.

In the anticipatory vehicle position estimating section 18, based on a vehicle speed sent from the speed sensor 6, a steering wheel angle from the steering wheel angle sensor 7, a decision result from a narrow-road decision processing section 13, and a two-dimensional map from the two-dimensional map preparation section 14, an anticipatory position on the two-dimensional map of the vehicle 1, which the vehicle 1 will reach set-time later (for example, two seconds later) under the same driving condition, is anticipated according to the motion equation of the vehicle 1 previously set based on specifications of the vehicle 1, or the like. The determined anticipatory position is output to the information control section 19.

The information-control section 19 synthesizes the ideal drive-route determined in the ideal drive-route calculation section 17 and the anticipatory position determined in the anticipatory vehicle position estimating section 18 and outputs signals onto the state-display section 8 such as a monitor provided in the vehicle room, together with the two-dimensional map prepared in the two-dimensional map preparation section 14. Accordingly, the driver sees the state-display section 8 to easily recognize whether the vehicle 1 can avoid a barrier or not and moreover, to recognize easily and quickly what driving-operation should be carried out, and to acquire barrier information which the driver has not been aware of.

Thus, according to this embodiment, the narrow-road decision processing section 13, the turning-area setting section 16, the ideal drive-route calculation section 17, the anticipatory vehicle position estimating section 18, and the information control section 19 constitute a guide means.

Figure 3:
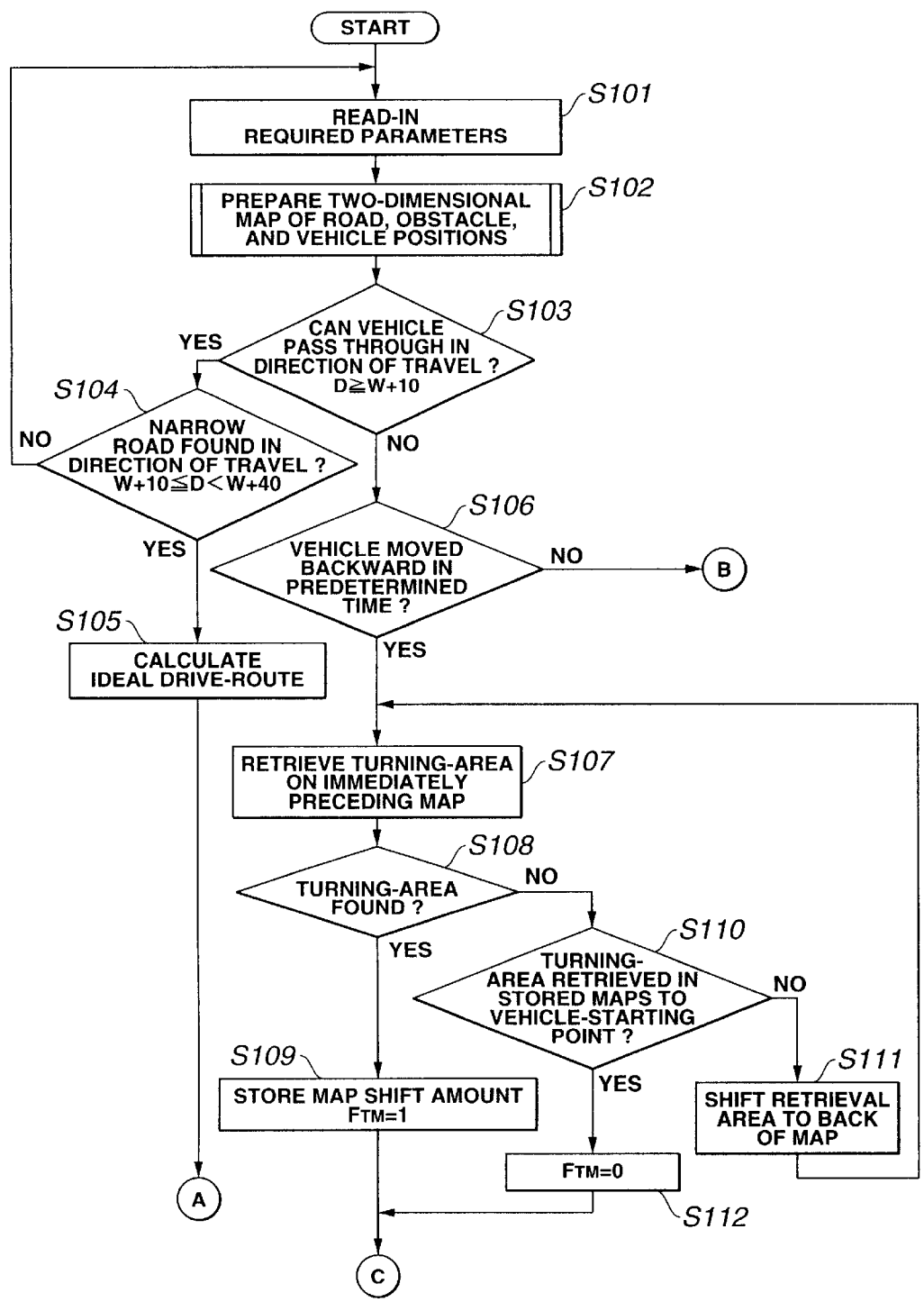
FIG. 3 is a flow chart showing the control of narrow-road guiding.
Figure 4:
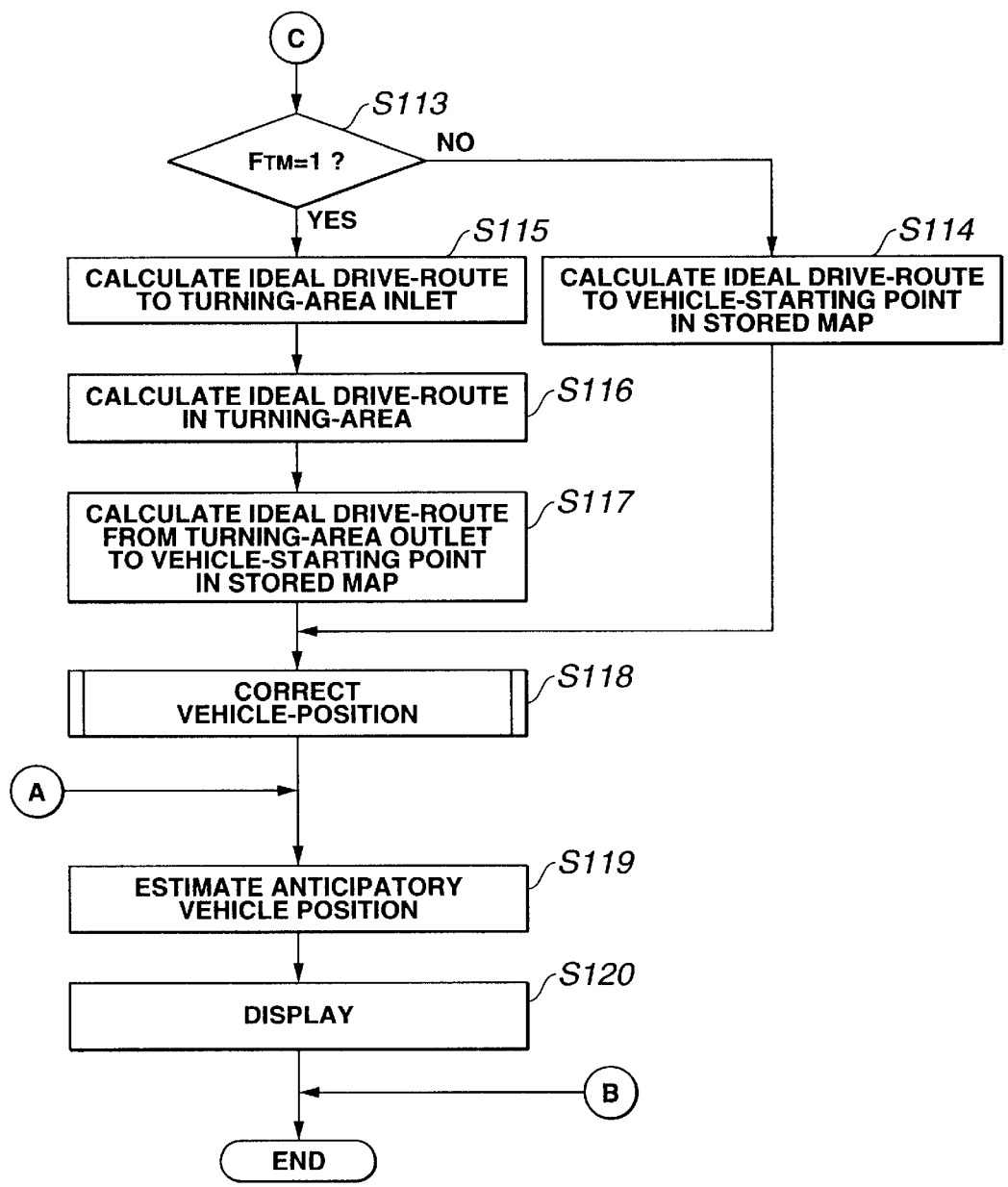
FIG. 4 is a flow chart continuing from FIG. 3.

Hereinafter, the operation of the vehicle active drive assist device having the above-described configuration will be described with reference to the flow chart of FIG. 3.

The program is started. First, at a step (hereinafter, briefly referred to as S) 101, required parameters are read in.

Next, at S 102, in the two-dimensional map preparation section 14, environmental position information (two-dimensional map) prepared in the past (the last time) is updated one after one, based on a steering wheel angle θ, a vehicle speed V, and a relative position information (information on a road and a barrier) according to a two-dimensional map preparation routine (FIG. 5) which will be described later, so that the two-dimensional map of the environment in the periphery of the vehicle 1 including the travelling direction of the vehicle 1 is prepared.

Thereafter, the operation is transferred to S 103, where it is decided whether the road-width D<W+10, that is, whether it is impossible for the vehicle 1 pass through the road in the travelling direction or not. If D≧W+10, that is, if it is not impossible for the vehicle 1 to pass through the road, the operation is transferred to S 104, where it is decided whether the road-width D in the traveling direction is W+10≦D<W+40, that is, it is decided whether a road for a driver to be guided on exists or not.

If the road-width D≧W+40, that is, if there exists no narrow road on which the driver should be guided, the operation is returned to S 101. If W+10≦D<W+40, that is, if there exists a narrow road on which the driver should be guided, the operation is transferred to S 105, and an ideal drive-route to the narrow road is obtained by calculating in the ideal drive-route calculation section 17.

Thereafter, the operation is transferred to S 119, and in the anticipatory vehicle position estimating section 18, an anticipatory position which the vehicle 1 will reach set-time later (for example, two seconds later) with the same drive-condition being maintained is determined according to the motion equation of the vehicle 1 previously set based on the specifications of the vehicle 1.

Succeedingly, the operation is transferred to S 120, where the information control section 19 outputs signals to the state-display section 8 such as a monitor provided in the vehicle room, and synthesizes the ideal drive-route determined at S 105 and the anticipatory position determined at S 119 to display on the two-dimensional map prepared in the two-dimensional map preparation section 14 as shown in FIG. 12. Then, the operation exits from the program.

On the other hand, if it is decided that the road-width D<W+10, and the vehicle 1 will be unable to pass the road at S 103, the operation is transferred to S 106, where it is decided whether the vehicle 1 is backed in predetermined time (for example, 10 seconds) or not.

As a result, if the vehicle has been backed in predetermined time (for example, 10 seconds), it is decided that the vehicle 1 will be returned on the road where the vehicle 1 has traveled. Thus, the operation is transferred to S 107. If the vehicle 1 has not been backed, it is decided that the vehicle 1 will stop as it is. The operation exits from the program.

At S 106, it is decided that the vehicle 1 has been backed in predetermined time, and the operation is transferred to S 107. In the turning-area setting section 16, a turning-area on the road where the vehicle 1 has traveled as shown in FIG. 10 is retrieved in the map of the immediately preceding place.

Thereafter, the operation is transferred to S 108, where it is decided whether the turning-area exists or not. If the turning-area exists, the operation is transferred to S 109, where a turning map-retrieval flag F TM is set to the 1 state. If no turning-area exists, the operation is transferred to S 110, where it is decided whether the turning-area has been retrieved in the stored maps tracing back to the starting point of the vehicle 1.

If the turning-area has not been retrieved in the stored maps tracing to the starting point of the vehicle 1 at S 110, the retrieval area is shifted to the back of the stored maps at S 111. The operation is returned to S 107, and the retrieval of the turning-area is executed again. If the turning-area has been retrieved in the stored maps tracing back to the starting point of the vehicle 1, the operation is transferred to S 112, and the turning map-retrieval flag F TM is cleared to the 0 state.

After the turning map-retrieval flag F TM is set at S 109, or the turning map-retrieval flag F TM is cleared at S 112, the operation is transferred to S 113, where the state of the turning map-retrieval flag F TM is decided.

As a result of the decision, if the turning map-retrieval flag F TM is cleared, the operation is transferred to S 114. An ideal drive-route in which the vehicle 1 is backed as it is to the starting point of the vehicle 1 in the stored maps is obtained by calculating in the ideal drive-route calculation section 17. The operation is transferred to S 118, where the position on the map of the vehicle 1 is corrected as shown in the vehicle-position correcting routine (FIG. 6) which will be described later. Then, the operation is transferred to S 119. An anticipatory position which the vehicle will reach set-time later with the same drive-condition being maintained is determined according to the motion equation previously set based on specifications of the vehicle 1 in the anticipatory vehicle position estimating section 18.

Succeedingly, the operation is transferred to S 120. The information control section 19 outputs a signal onto the state-display section 8 such as a monitor or the like provided in the vehicle room, and synthesizes the ideal drive-route determined at S 114 and the anticipatory position of the vehicle 1 determined at S 119 to display on the two-dimensional map. The operation exits from the program.

On the other hand, if the turning map-retrieval flag F TM is set at S 113, the operation is transferred to S 115, and an ideal drive-route to the inlet of the set turning-area is prepared by calculating in the ideal drive-route calculation section 17. Moreover, the operation is transferred to S 116, where an ideal drive-route (preset drive-route) in the turning-area is prepared by calculating in the ideal drive-route calculation section 17. The operation is transferred to S 117, and an ideal drive-route from the outlet of the turning-area to the starting point of the vehicle in the stored map is prepared by calculating in the ideal drive-route calculation section 17.

The operation is transferred to S 118, and the vehicle position on the map is corrected. Then, the operation is transferred to S 119. In the anticipatory vehicle position estimating section 18, an anticipatory position which the vehicle 1 will reach set-time later with the same drive-condition being maintained is determined according to the motion equation of the vehicle 1 or the like previously set based on specifications of the vehicle 1.

Then, the operation is transferred to S 120. The information control section 19 outputs a signal onto the state-display section 8 such as a monitor or the like provided in the vehicle room, and synthesizes the ideal drive-route determined at S 115, S 116, and S 117 and the anticipatory position determined at S 119 to display on the two-dimensional map, following by exiting from the program.

As described above, the vehicle active drive assist device of this embodiment can cope with different situations in addition to the case where the vehicle is parked. The device informs the driver of any barrier existing in the travelling direction and guide him so that he can decide the situations easily, quickly, and correctly to avoid the barrier and drive the vehicle through a narrow road.

Moreover, if the situations existing forward of the vehicle are such that the vehicle can not travel, the device guides the driver so that the vehicle is turned or backed to run on the road where the vehicle has traveled. Thus, not only in the case in which a narrow road visually recognizable exists forward of the vehicle but also in the case in which the vehicle travels passing through the narrow road and then is returned to pass through the narrow road again, the device can adequately guide the driver. Thus, the device can assist a driver in driving a vehicle effectively in practice.

Figure 5:
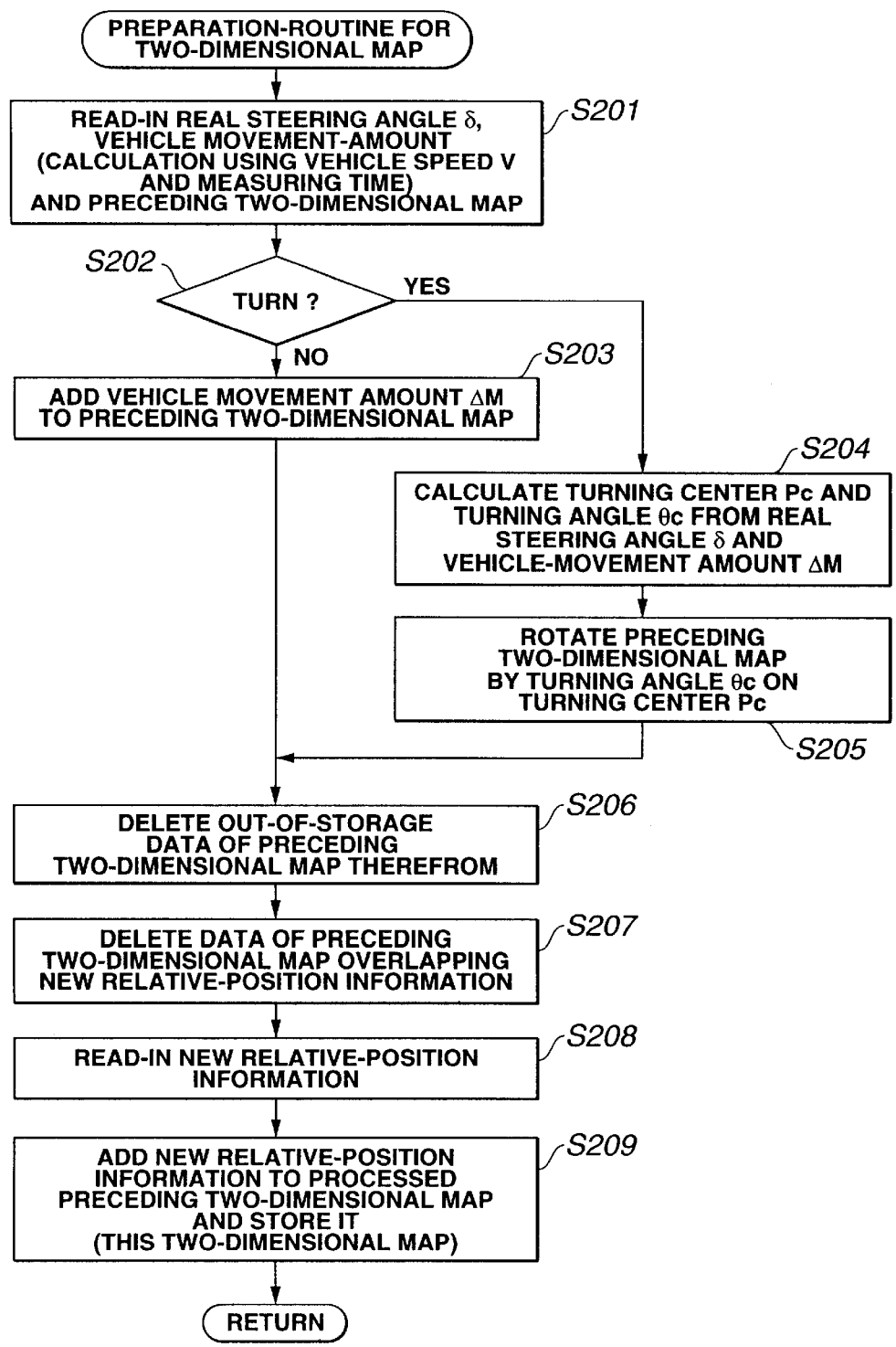
FIG. 5 is a flow chart showing a preparation routine for a two-dimensional map.

FIG. 5 is a flowchart of a routine for preparing a two-dimensional map which is executed in the two-dimensional map preparation section 14. When this routine is started, first, the real steering angle δ caused by a steering wheel angle θ, a vehicle movement amount ΔM (calculated based on the vehicle speed and the measuring time), and the two-dimensional map prepared the last time are read in.

Thereafter, the operation is transferred to S 202, where it is decided whether the vehicle is in the turning state or running-straight state based on the real steering angle δ. If the vehicle is in the running-straight state, the operation is transferred to S 203. If the vehicle is in the turning state, the operation is transferred to S 204.

If it is decided that the vehicle is in the running-straight state at S 202, the operation is transferred to S 203. The vehicle movement amount ΔM is added to the two-dimensional map prepared the last time (processed according to the formulas (1) and (2)), and the operation is transferred to S 206.

On the other hand, if it is decided that the vehicle is in the turning state at S 202, the operation is transferred to S 204. The turning center PC and the turning angle θc are calculated based on the real steering angle δ and the vehicle movement amount ΔM (calculated according to the formulae (3), (4), and (5)), and the operation is transferred to S 205, where the two-dimensional map prepared the last time is rotated by the turning angle θc on the turning center PC (processed according to the formulae (6) and (7)). Then, the operation is transferred to S 206.

When the operation is transferred from S 203 or S 205 to S 206, the date which is contained in the two-dimensional map prepared the last time and is out of the storage area, caused by the processing at S 203 or S 205, is erased.

Succeedingly, the operation is transferred to S 207. The data in the two-dimensional map prepared the last time, duplicated by the new relative position information of the solid obtained by processing at S 203 and S 205 is erased.

Next, the operation is transferred to S 208. The relative position coordinate (relative position information) viewed from the vehicle 1 is read in. The operation is transferred to S 209, where the new relative position information is added to the two-dimensional map prepared the last time at S 207 to be stored. This solid position information is a new two-dimensional map updated this time.

When the control program is executed the next time, the new two-dimensional map prepared this time and stored is read in as the two-dimensional map prepared the last time to be processed. Since the two-dimensional map is prepared in this way, the position of a solid, which was recognized forward of the vehicle, and has shifted onto the side of the vehicle, caused by the movement of the vehicle, can be comprehended. Thus, the device can assist the driver in driving the vehicle against a barrier existing on the side of the vehicle as well as a barrier existing forward of the vehicle.

Figure 6:
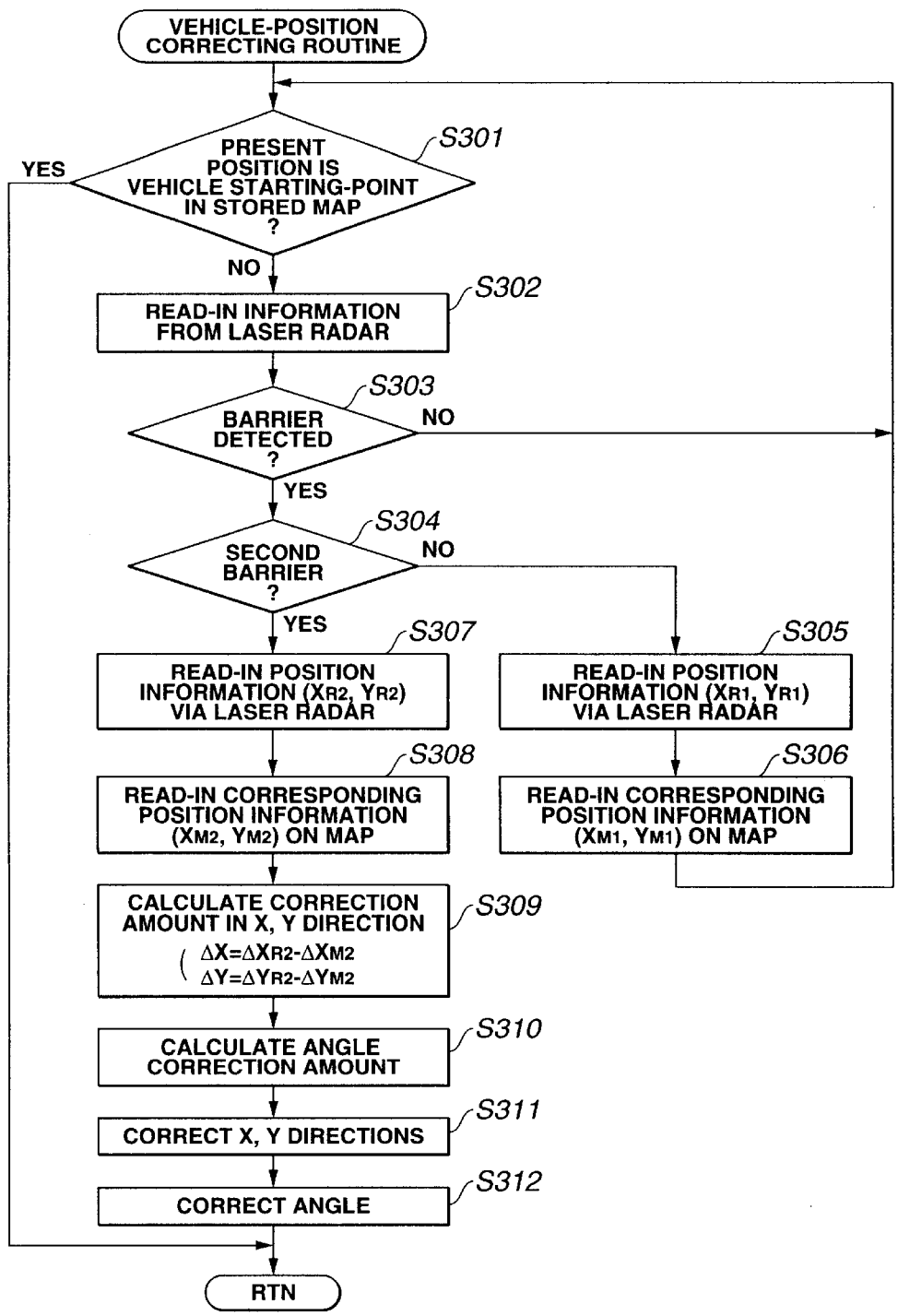
FIG. 6 is a flow chart showing the correction routine for vehicle position.
Figure 7:
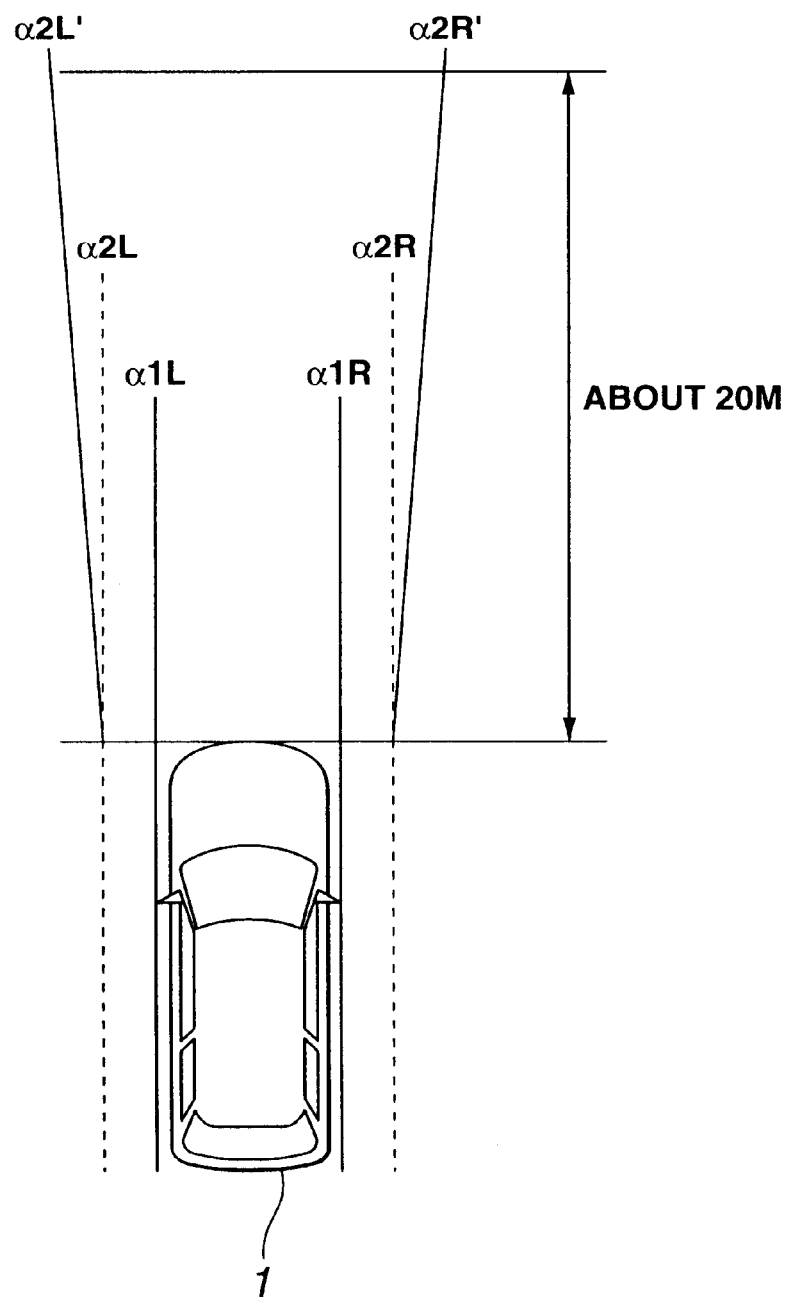
FIG. 7 illustrates the decision range for a narrow road.

FIG. 6 shows a flowchart of a vehicle position correcting routine which is executed in the vehicle position correcting section 15. When this routine is started, first, at S 301, it is decided whether the present position is the vehicle starting point in the stored maps or not. If the present position is the vehicle starting point in the stored maps, the vehicle 1 has reached its destination. Thus, it is not necessary to correct the vehicle position, and therefore, the operation exits form the routine.

If the present position is not the vehicle starting point in the stored maps, the operation is transferred to S 302, where information from the laser radar 5 is read in.

Thereafter, the operation is transferred to S 303, where it is decided whether a barrier is detected in the information from the laser radar 5 or not. If no barrier is detected, the operation is returned to S 301. If a barrier is detected, the operation is transferred to S 304, where it is decided whether the detected barrier is a second barrier or not (whether the barrier is detected at the second time or not).

If the barrier detected at S 304 is not the second barrier, that is, is the first barrier, the operation is transferred to S 305. The position information from the laser radar 5 is read in as a coordinate (X R1, Y R1), and the operation is transferred to S 306. The corresponding (nearest) position information on the map is read in as a coordinate (X M1, Y M1), and the operation is returned to S 301.

On the other hand, if it is detected that the barrier is the second barrier at S 304, the operation is transferred to S 307. The position information from the laser radar 5 is read in as a coordinate (X R2, Y R2), and the operation is transferred to S 308. The corresponding (nearest) position information on the map is read in as a coordinate (X M2, Y M2).

Thereafter, the operation is transferred to S 309. A shift amount (ΔX=X R2−X M2, ΔY=Y R2−Y M2) which offsets the solid position (X M2, Y M2) using the practical position (X R2, Y R2) of the second barrier as a reference is calculated.

Succeedingly, the operation is transferred to S 310. An angle defined by the straight line passing through the practical coordinates (X R1, Y R1) and (X R2, Y R2) of the first and second barriers and the straight line passing through the coordinates (X M1, Y M1) and (X M2, Y M2) on the map of the first and second barriers is calculated as an angular correction amount.

The operation is transferred to S 311, where the map is shifted by the shift amount calculated at S 309 so that the XY direction is corrected. The operation is transferred to S 312, where the map is rotated on the practical coordinate (X R2, Y R2) of the second barrier as the center for correction in the angular direction. The operation exits from the routine.

In this way, according to this embodiment, when the vehicle is returned on the road where the vehicle has traveled, the position on the map of the vehicle is corrected. Thus, the position of the vehicle, even if it is shifted caused by finely steering or the like, can be securely corrected. Thus, the device can accurately guide the vehicle.

According to this embodiment, as the information for correcting the position of the vehicle in the case in which the vehicle is returned on the road where the vehicle has traveled, information from the laser radar 5 is used. In addition, the practical position may be detected based on information from cameras or the like mounted so as to face backward for correction of the map.

As described above, the vehicle active drive assist device of the present invention can adequately guide the vehicle, needless to say, when a narrow road is visually recognized, and also, when the vehicle has passed through a narrow road and is returned to pass through the narrow road again. Advantageously, this device has high practical applicability.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A vehicle active drive assist device comprising:
    environmental position information forming means for forming position information of the environment in the periphery of a vehicle including the traveling direction of the vehicle;
    guide means for guiding the vehicle in passing through a narrow road in the traveling direction based on the position information of the environment in the periphery of the vehicle and
    guide narrow-road re-passing detection means for detecting that the vehicle is returned to the narrow road which the vehicle has been guided on and passed through;
    the guide means being applicable to guide the vehicle so as to reach the narrow road by at least one of a movement including turning of the vehicle and the backing of the vehicle, based on the position information of the environment in the periphery of the vehicle formed by the environmental position information forming means, when the vehicle is returned to the narrow road again which the vehicle has been guided on and so as to pass through the narrow road.

2. A vehicle active drive assist according to claim 1, wherein the environmental position information forming means updates the environmental position information at any time, prepared in the past based on a movement state of the vehicle and a relative position information of the vehicle with respect to the road-geometry and a barrier existing forward of the vehicle, whereby the position information of the environment in the periphery of the vehicle including the traveling direction of the vehicle is formed.

3. A vehicle active drive device according to claim 2, wherein the movement state of the vehicle is determined based on at least one of the steering wheel angle of the vehicle and the speed thereof.

4. A vehicle active drive assist device according to claim 2, wherein the relative position information of the vehicle with respect to the road-geometry and a barrier existing forward of the vehicle is determined based on an image picking-up by means of a pair of cameras mounted onto the vehicle.

5. A vehicle active drive assist device according to claim 2, wherein the position information of the environment in the periphery of the vehicle including the traveling direction of the vehicle formed by the environmental position information forming means is obtained in the form of a two-dimensional map.

6. A vehicle active drive assist device according to claim 2, wherein the environmental position information forming means corrects the position information of the environment in the periphery of the vehicle including the traveling direction of the vehicle and the position of the vehicle, based on the position information of the practically detected solid, when the vehicle is guided again by the guide means to the narrow road on which the vehicle has been guided.

7. A vehicle active drive assist device according to claim 6, wherein the position information of the practically detected solid is detected by a laser radar mounted onto the vehicle.

8. A vehicle active drive assist device according to claim 1, wherein the guide narrow-road re-passing detection means decides that if the vehicle is backed in set-time after stopping of the vehicle, the vehicle will be returned to the narrow road which the vehicle has been guided on and passed through.

9. A vehicle active drive assist device according to claim 1, wherein the guide means decides whether an area where the direction of the vehicle can be turned exists or not, based on the position information of the environment in the periphery of the vehicle formed by the environmental position information forming means, when the vehicle is returned to the narrow road which the vehicle has been guided on and passed through, and if the area where the direction of the vehicle can be turned exists, the guide means guides the vehicle so that the vehicle is backed to the area where the direction of the vehicle can be turned, and guides the vehicle when the vehicle is turned in the area where the direction of the vehicle can be turned.

10. A vehicle active drive assist device according to claim 9, wherein the area where the direction of the vehicle can be turned is one of quadrangular areas of several types previously set correspondingly to specifications of the vehicle.

11. A vehicle active drive assist device according to claim 1, wherein the guide means decides whether an area where the direction of the vehicle can be turned exists or not, based on the position information of the environment in the periphery of the vehicle formed by the environmental position information forming means, when the vehicle is returned to the narrow road which the vehicle has been guided on and passed through, and if no area where the direction of the vehicle can be turned exists, the guide means guides the vehicle so that the vehicle reaches the area where the direction of the vehicle can be turned only by backing.

12. A vehicle active drive assist device according to claim 11, wherein the area where the direction of the vehicle can be turned is one of quadrangular areas of several types previously set correspondingly to specifications of the vehicle.

13. A vehicle active drive assist device according to claim 1, further comprising:
    a monitor for displaying the position relation between the vehicle and a barrier;
    an anticipatory position which the vehicle will reach set-time later with the same drive-condition being maintained; and
    an ideal drive-route for the vehicle traveling on a narrow road on a two-dimensional map viewed form the vertical direction.

14. A vehicle including the vehicle active drive assist device defined in claim 1 in which the driving is guided by the vehicle active drive assist device.

* * * * *